Oct. 29, 1929.  M. STEINER  1,733,838
TRAY
Filed Jan. 23, 1928
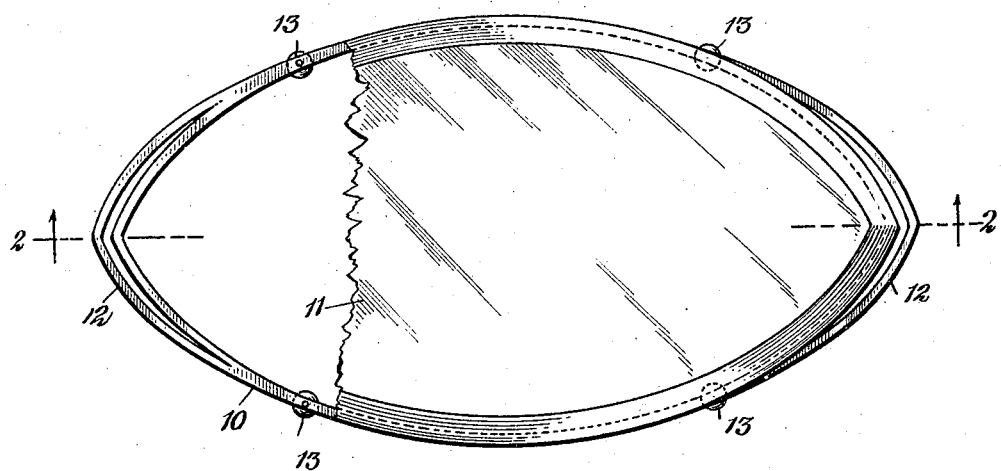
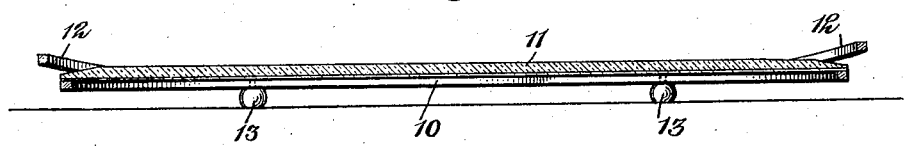
WITNESSES
INVENTOR
Malcolm Steiner
BY
ATTORNEY Patented Oct. 29, 1929

1,733,838

UNITED STATES PATENT OFFICE

MALCOLM STEINER, OF NEW YORK, N. Y.

TRAY

Application filed January 23, 1928. Serial No. 248,793.

This invention relates to the class of trays used for domestic and other purposes for holding divers articles, and for serving beverages and other refreshments and edibles.

More particularly the invention relates to the class of ornamental and decorative trays of the indicated character.

Some of the objects of the invention are: to provide a tray of the indicated character of extremely simple construction and ornamental appearance consisting of but two parts so constructed and formed as to mutually combine to form a tray without the use of any fastening means, and to provide a tray consisting of a decorative or ornamented rim or frame and a decorative or ornamental bottom or article holding plate, the rim or frame being so formed as to provide an arrangement of handles and other portions, whereby the bottom or article holding plate may properly repose on the rim or frame held against lateral slipping, yet removable therefrom, and to enable a person to conveniently handle the tray without possibility of the bottom or article holding plate being unintentionally separated from the rim or frame.

With the foregoing, other objects of the invention will appear from the embodiment of the invention, which by way of example is described in the following specification and illustrated in the accompanying drawing, it being understood that no limitation is made to the precise form and construction of the parts, since changes and modifications may be resorted to without departing from the spirit of the invention as expressed in the appended claims.

In the drawing:

Figure 1, is a plan view of a tray made in accordance with the present invention, a portion of the bottom or article holding plate being broken away to show certain features.

Fig. 2, is a sectional view taken on the line 2—2, Fig. 1.

In the illustrated embodiment, the tray consists of two main parts, a part 10, and a part 11. The part 10 consists of a frame or rim which may be of any preferred shape and size, and which may be made of any preferred material. The said frame or rim is of elliptical or oval shape, is made of metal, and is formed with handles 12 respectively at the opposite ends thereof. The handles 12 in the present instance are integral with the rim, and are disposed angularly above the plane of the rim. The rim 10 has formed therewith or secured thereto suitable feet 13 in the form of globular members in the present instance. The rim 10 and handles 12 may be hammered and bronzed or colored to produce an ornamental and decorative appearance or effect.

The part 11 constitutes a bottom or article holding plate, and in the present instance is in the form of a beveled mirror. The mirror will be substantially of the same size as the rim 10 and will conform to the shape of the rim. It will be apparent that the rim 10 and the mirror 11 are so formed as to mutually combine to produce the tray with the mirror in repose on the rim held in position against lateral slipping movement in any direction with respect to the rim.

In accordance with one feature of the invention, each handle 12 is so formed as to be spaced from the adjacent section of the rim 10 to enable a person to grip each handle, and to use the fingers of each hand to hold the mirror or part 11 against any unintentional upward movement with respect to the rim 10 to prevent separation of the part or mirror 11. It will also be apparent that the part or mirror 11 may be readily separated or removed from association with the rim 10. It is to be understood that any other bottom or article holding plate may be used in lieu of the mirror.

From the foregoing it will be apparent that there has been described a tray which is of extremely simple construction, consisting of but two main component parts which may be brought together without the use of any fastening means whatsoever, and that it may be produced at a comparatively low cost.

I claim:

1. A tray comprising a part having handles, and a separate article holding part freely resting on the first mentioned part in contact with the handles which hold it from slipping in any direction with respect to said first mentioned part.

2. A tray comprising a part having handles, and a separate article holding part freely resting on the first mentioned part in contact with the handles which hold it from slipping in any direction with respect to said first mentioned part, said handles being so formed as to permit them to be gripped with the hands with the fingers of the hands in engagement with the article holding part to prevent unintentional separation of the parts.

3. A tray comprising a frame having handles, and an article holding plate freely resting on the frame and which is in contact with the handles which hold it from slipping in any direction with respect to the frame.

4. A tray comprising a frame having handles, and an article holding plate of substantially the same shape as the frame, said plate freely resting on the frame, said handles being integral with the frame and so formed as to engage the plate to prevent it from slipping in any direction with respect to the frame.

5. A tray comprising a frame provided with handles each of which projects upwardly beyond the adjacent portion of the frame, and a separate article holding part of substantially the same shape and size of the frame, said part freely resting on the frame, and said handles being so formed as to engage edge portions of said part to hold the part in place and to prevent it from slipping in any direction with respect to the frame.

Signed at New York, in the county of New York and State of New York, this 21st day of January, A. D. 1928.

MALCOLM STEINER.